United States Patent Office 3,354,957
Patented Nov. 28, 1967

3,354,957
METHOD OF ACID TREATING WELLS
Richard L. Every and D'Arcy A. Shock, Ponca City, Okla., assignors to Continental Oil Company, Ponca City, Okla., a corporation of Delaware
No Drawing. Filed June 4, 1965, Ser. No. 461,506
5 Claims. (Cl. 166—39)

ABSTRACT OF THE DISCLOSURE

A method for increasing the permeability of a subterranean formation comprising introducing substantially pure liquid anhydrous hydrogen chloride into said formation via a well bore to permit the hydrogen chloride to penetrate deeply into the formation and there form a strong effective acid with the irreducible water content of the formation.

---

This invention relates to methods for increasing the production of wells. More specifically, the invention is concerned with a method for increasing the permeability of a subterranean formation containing water or fluid hydrocarbon deposits and traversed by a well used to produce such fluids, such increase in permeability being achieved by treating the formation with an acid.

Various acidizing procedures have been used for increasing the effective permeability of a subterranean formation traversed by a producing well so as to increase the production from the well. A commonly used technique employs aqueous hydrochloric acid as the acidizing material, and in conformity with convention in the acidizing art, entails injecting the acid into the formation from the well bore so that the acid can contact and react with the formation material defining the flow channels to the well bore.

The aqueous hydrochloric acid treatment has generally worked well in some types of limestone formations, but two disadvantages have characterized this acidizing agent which have led reservoir engineers to try to devise improved methods of acidizing using other materials. One of the shortcomings of the aqueous hydrochloric acid treatment results from the high reactivity of the acid with the formation which frequently results in most of the effectiveness of the acid being dissipated by reaction with the formation before the bulk of the injected liquid has penetrated the formation for any substantial distance. Although it is most important to achieve the greatest increase in permeability in the portion of the formation immediately adjacent the well bore, it is also highly desirable to increase the effective permeability of the radially outer portions of the formation.

Another difficulty which has been experienced in the hydrochloric acid well treatment is the tendency of the more minute channels and capillary passageways in the outlying reaches of the formation to become plugged or blocked by fine insoluble salts produced in part by reaction of the acid with the formation and moved into restrictions in the flow channels by the injected acid.

One proposal for overcoming the described difficulties associated with aqueous hydrochloric acid treatment has been to inject into the formation, a non-aqueous solution of an acid forming material, such as an alcohol solution of hydrogen chloride; then, after this solution has penetrated deeply into the formation, injecting water into the formation to intermingle with the non-aqueous solution, and by contact with the acid forming material therein, produce an acid which can attack or react with the formation to achieve the desired increase in permeability. Prior to the time the acid thus formed is completely neutralized, flow is reversed and the acid-carrying liquid is flushed from the formation.

In another technique, liquid chlorine is injected into the formation where it vaporizes and attacks the reservoir rock to increase the effective permeability of the formation.

The present invention is an improved method of acidizing for the purpose of increasing the effective well bore diameter and the effective permeability of the formation and, therefore, increasing the productivity of the well. The method is more economical and efficient than both the non-aqueous solution technique and the liquid chlorine procedure, and is also less dangerous to operating personnel than the liquid chlorine procedure.

Broadly described, the method of the invention comprises introducing anhydrous hydrogen chloride into the producing formation via the well bore to permit the hydrogen chloride to penetrate deeply into the formation and there form a strong, effective acid with the irreducible water content of the formation. In some instances, it may be desirable to flush the acid from the formation after it has had an opportunity to react in order to avoid plugging or loss of advantage due to deposition of gelatinous deposits or the like.

More specifically characterized, the process of the invention contemplates the initial introduction into the well bore of liquid anhydrous hydrogen chloride under a pressure sufficient to force the liquid into the formation. The critical temperature of hydrogen chloride is 51° C. so that, upon injection into the reservoir, the hydrogen chloride will, in practically every instance, be converted by the high formation temperatures to a gas. The gas will then penetrate deeply into the formation and will form hydrochloric acid immediately upon contact with the connate water located in the formation. By formation of the acid in this manner, the acid is located at the instant of its formation in the precise situs where it is desired to achieve the leaching action, i.e., on the surface of the grains of the formation materials which define the flow channels.

The anhydrous hydrogen chloride technique possesses a number of advantages over procedures heretofore employed. As compared to the aqueous hydrochloric acid and also the non-aqueous solution of an acid-forming material procedures, the anhydrous hydrogen chloride method requires a relatively small amount of the liquefied anhydrous hydrogen chloride to be stored at the well site, and a relatively small amount of this material is expended in the acidizing treatment. Conversion of the liquid material to a gaseous form within the formation permits small volumes of the liquid to be injected with the object of acidizing a relatively large total reservoir volume. The effective use of a gas in the formation has the further advantage of more efficient sweeping of the formation with the acid forming material, since the gas will penetrate the smallest pores and channels and will not flow selectively into areas offering less resistance to liquid flow by reason of variations in permeability over varying vertical levels within the producing formation.

It is also possible in using anhydrous hydrogen chloride to be more selective in the type of treatment employed under varying reservoir conditions in that by control of the temperature of the liquid anhydrous hydrogen chloride which is injected into the formation, the point at which the liquid material vaporizes can be selectively controlled so that the area immediately adjacent the well bore can be subjected to a more concentrated treatment than the outlying portions of the formation.

Another advantage which is characteristic of the method of the present invention as compared with previously used methods is the relatively non-corrosive nature of the anhydrous hydrogen chloride which prevents it from attacking the tubing and casing of the well, and presents less problem in handling than liquid chlorine. The material is non-flammable, and thus possesses an advantage over the employment of the non-aqueous solutions proposed in the prior art in which the solvents used are liquid hydrocarbons, alcohols or ethers. Finally, the anhydrous hydrogen chloride, while to some extent noxious and constituting some hazard to operating personnel, does not present nearly so serious a problem in this respect as chlorine gas.

From the foregoing description and brief discussion of some of the advantages of the present invention, it will have become apparent that it is a major object of the present invention to provide an improved method for increasing the production of hydrocarbon fluids from a well traversing a subterranean formation containing such fluids.

A further object of the present invention is to provide a method of acidizing a hydrocarbon producing formation, which method requires the transporting, handling and storing of substantially less material than acidizing methods utilizing aqueous hydrochloric acid solutions and non-aqueous solutions of acid forming materials.

An additional object of the present invention is to provide an improved acidizing technique for use in improving the production of oil and gas wells, which technique utilizes an acid forming material which is less corrosive than hydrochloric acid or liquid chlorine.

A further object of the present invention is to provide an improved method of acidizing a formation which entails forming hydrochloric acid in situ in the formation, utilizing the irreducible connate water content of the formation.

Another object of the present invention is to provide a procedure for acidizing oil and gas wells in which the extent to which the permeability of the formation is increased can be selectively controlled by control of the temperature of a liquid injected into the formation.

Other objects and advantages of the invention will become apparent when the following detailed description of the invention is considered.

The acid treating process of the present invention is carried out by the same general procedure as that conventionally used in acid treating, the primary departure from the prior art residing in the employment of an effective amount of anhydrous hydrogen chloride, and the reliance upon irreducible water saturation of the formation to form the effective acid with the hydrogen chloride, rather than upon separately injected water. The anhydrous hydrogen chloride is stored at the well site as a liquid at relatively low temperatures, and preferably, at superatmospheric pressures. As has previously been indicated, the critical temperature of the hydrogen chloride is 51° C. Thus, the anhydrous hydrogen chloride must be stored at a temperature below 51° C. At atmospheric pressure, the boiling point of the liquid hydrogen chloride is −83° C. Since the hydrogen chloride must be pressured into the formation, however, at pressures of from 200 to 3,000 p.s.i.g., it is preferred to maintain the liquid HCl at least under some superatmospheric pressure, the pressure utilized during storage being dependent largely upon economic considerations limiting the use of compressors and similar equipment. Preferably, cryogenic temperatures are utilized in the storage ranging from about −10° C. downwardly to about −150° C. The actual temperature at which the liquid is injected into the formation is of considerable importance in the control of the acidizing procedure as will be hereinafter described.

Although acid injection procedures are performed in several ways, depending upon the particular characteristics of the well and the equipment available, a widely used procedure may be described by way of example. Before treatment, the well is pumped dry and the pump and sucker rods are pulled. The hole is then filled with oil or another non-aqueous fluid. Liquid anhydrous hydrogen chloride is then pumped down the tubing while the casing annulus valve at the wellhead is left open to permit discharge of the displaced oil at the surface. When a sufficient volume of the acid has been injected to displace the entire tubing string and the annular section opposite the pay zone, the annulus valve is closed. The pressure on the hydrogen chloride is then increased to force the hydrogen chloride into the formation at a rate of injection such that proper motion of the liquid into the formation is sustained.

The temperature at which the liquid anhydrous hydrogen chloride is pumped into the tubing string will be dependent upon the precise character of acidizing which is desired. If it is desired to achieve the greatest increase in permeability immediately adjacent the well bore, the temperature of the liquid hydrogen chloride pumped downwardly in the tubing will be sufficiently low that the relatively high bottom hole temperatures will not cause immediate vaporization of the hydrogen chloride. Since bottom hole temperatures will generally exceed by a considerable amount the critical temperature (51° C.) of the hydrogen chloride, it will be necessary, in order to retain the material in the liquid state, to inject the hydrogen chloride at a temperature substantially below this value. As the liquid hydrogen chloride is warmed, it will be vaporized at the critical temperature or some point therebelow, depending upon the pressure under which the material is injected into the formation. Upon vaporization, the hydrogen chloride gas diffuses in all directions in the formation and penetrates through the smallest channels present therein. Immediately upon contact with the connate water adsorbed on the mineral particles which make up the formation, the hydrogen chloride gas will ionize in the water solution which is formed and the hydrochloric acid thus yielded will immediately commence to attack and leach the formation and enlarge the flow channels therein. The injected hydrogen chloride, containing no water, does not detrimentally affect the formation as a result of the presence of water sensitive clays, and the gas, once evolved in the formation, does not have as great a tendency to dissolve or sweep out the water therein as would be the case if a purely liquid acidizing material were used, or if an alcoholic or carrier material constituting an effective solvent for water were utilized. After an effective amount of the hydrogen chloride has been injected into the formation, it may be desirable to use an amount of oil to further displace or follow the hydrogen chloride into the formation and drive it to the depth desired in the formation. The amount of hydrogen chloride which constitutes "an effective amount" may vary widely. In general, at least about 8 and preferably at least about 10 barrels of hydrogen chloride should be injected per vertical foot of formation to be treated. Upper limits on the amounts of injected hydrogen chloride are dependent on economics rather than technology and therefore will be determined on an individual basis.

Upon completion of the injection of the anhydrous hydrogen chloride into the formation, the well is preferably shut in and allowed to stand for from two hours to several days to permit the acid an opportunity to react effectively. Preferably, the well is allowed to remain in the closed-in condition for several hours. The residual hydrogen chloride, the hydrochloric acid which is formed and the gelatinous and insoluble salt materials are then removed from the formation and the well by flowing, swabbing or pumping, or during the course of ordinary production. Preferably, the formation is back flushed with a quantity of oil or water to thoroughly cleanse the flow channels and remove potentially obstructive material therefrom. The cleansing of the formation by back flowing is preferably commenced prior to the time that the acid formed by the hydrogen chloride and water is completely inactivated by neutralization.

The effectiveness of the anhydrous hydrogen chloride treatment in increasing the permeability of typical formation rock is illustrated by the following examples.

Example 1

Six limestone cores from the Paradox formation in Southeast Utah were saturated with distilled water and then reduced to irreducible water saturation by a vacuum technique. This water content is the minimum water saturation which is to be expected in an oil reservoir.

Three of the cores were cleaned and cooled by immersion for 30 seconds in liquid nitrogen, and were next immersed in liquid anhydrous hydrogen chloride for 144 minutes. The cores were then removed from the hydrogen chloride and placed in a vacuum desiccator for 1 hour.

The three remaining cores were cooled by liquid nitrogen and placed in a bomb which was also cooled with liquid nitrogen. The bomb was pressured to 1,000 p.s.i. with liquid anhydrous hydrogen chloride and the pressure maintained 3 minutes. The pressure was then released and the hydrogen chloride allowed to boil away. The bomb-treated core samples were then placed in a vacuum desiccator for 1 hour.

After vacuum desiccation, the cores were saturated with 80 pale oil and their oil permeability determined. The results of these tests are set forth in Table I.

TABLE I

| Core No. | Original Air Permeability, Ka | Permeability After HCl Treatment, Ko | Percent Change |
| --- | --- | --- | --- |
| 1 | 400 | 6,817 | +1,700 |
| 2 | 10 | 0 | −100 |
| 3 (Bomb) | 86 | 135 | +157 |
| 4 | 1,510 | 20,981 | +1,390 |
| 5 (Bomb) | 3.7 | 0 | −100 |
| 6 (Bomb) | 27 | 0 | −100 |

It can be perceived in referring to the data set forth in Table I that the anhydrous hydrogen chloride treatment of the cores increased the permeability of the cores having a relatively high original permeability. In the case of the low permeability or tight cores, a slight decrease in the permeability resulted from the treatment and was believed to be due to the precipitation of some of the reaction product or insoluble precipitate formed by reaction of the acid with the carbonate. By thoroughly cleaning up the cores by flushing with fresh water, the air permeability of the cores was increased in the case of two of the cores, one of which was a relatively tight core (core 6) having an original permeability of 27 millidarcies.

Example 2

A productive formation lying at 5656 feet and 187 feet in thickness is penetrated by a well. The well produces 19 barrels of oil per day and has a bottom hole pressure of 2283 p.s.i. and a bottom hole temperature of 163° F. The well also produces 17 barrels of water per day.

In treating the well, 900 gallons of liquid anhydrous HCl is pumped into the well under a pressure of 2500 and at a temperature of −20° F. After the anhydrous HCl has penetrated into the formation, the well is shut in for a period of 12 hours. Pumping of the well is then resumed. The effective permeability and production of the formation are increased by a factor of about ten.

From the foregoing discussion, it will have become apparent that the present invention provides an improved process for acidizing a hydrocarbon bearing formation so as to increase the permeability thereof, and therefore increase production from the formation. The method permits greater selectivity and control over the portion of the formation which is most affected by the treatment, and is more economical to practice than methods using liquid hydrochloric acid, or non-aqueous solutions of acid forming materials as the acidizing agents. The anhydrous hydrogen chloride used is less corrosive and less noxious than chlorine. Moreover, the process can be practiced in formations containing water sensitive clays without the occurrence of detrimental consequences since the only water used in the process is that which occurs naturally (connate water) in the formation.

Although certain exemplary embodiments of the invention have been described herein with particularity and in detail, these embodiments are not intended to comprehend every alternative procedure, or modification in technique, which can be employed while relying upon the basic principles of the invention as broadly outlined herein. It is contemplated, for example, that various procedures can be used to inject the anhydrous hydrogen chloride into the producing formation, and that this material may be permitted to remain in the formation for various lengths of time, and either not be removed at all by positive steps in addition to production, or be flushed from the formation in a number of different ways. All such variations and modifications, in continuing to utilize the basic or fundamental principles of the invention, are deemed to be circumscribed by the spirit and scope of the invention as defined by the appended claims or reasonable equivalents thereof.

What is claimed is:

1. A method for increasing the production of wells in a water-bearing formation which is reactive to hydrochloric acid comprising introducing substantially pure liquid anhydrous hydrogen chloride into said formation traversed by the well.

2. The method claimed in claim 1 and further characterized to include the step of back flushing the formation with a liquid after said anhydrous hydrogen chloride has formed an acid with connate water in the formation, and said acid has reacted with the formation to increase the permeability thereof.

3. The process of treating a well in a water-bearing formation which is reactive to hydrochloric acid comprising
   (a) injecting substantially pure liquid anhydrous hydrogen chloride into the well bore; and
   (b) forcing said liquid anhydrous hydrogen chloride into the formation from the well bore to cause the hydrogen chloride to contact the interstitial water in the formation.

4. The method of acidizing a well in a water-bearing formation which is reactive to hydrochloric acid which comprises:
   (a) storing substantially pure liquid anhydrous hydrogen chloride at the well site at a temperature of from about −10° to about −150° C.; then
   (b) introducing said anhydrous hydrogen chloride to the formation via the well bore at a temperature and pressure such that the hydrogen chloride remains a liquid until it enters the formation and then is vaporized by the relatively high temperature in the formation.

5. The method defined in claim 4 and further characterized to include the steps of
   (a) shutting in the well and permitting the hydrogen chloride to remain in the formation for a period of at least two hours; then
   (b) back flushing the formation with a liquid to remove substantially all of the hydrogen chloride and hydrochloric acid therefrom.

(References on following page)

References Cited

UNITED STATES PATENTS

| | | | |
|---|---|---|---|
| 1,999,146 | 4/1935 | Ambrose et al. | |
| 2,059,459 | 11/1936 | Hund et al. | 166—42 X |
| 2,366,373 | 1/1945 | Voorhees | 166—42 X |
| 2,664,398 | 12/1953 | Bond. | |
| 2,675,083 | 4/1954 | Bond et al. | 166—42 X |
| 2,850,098 | 9/1958 | Moll et al. | 166—42 |
| 2,910,436 | 10/1959 | Fatt et al. | 166—42 X |
| 3,044,549 | 7/1962 | Jones. | |
| 3,076,762 | 2/1963 | Dill. | |
| 3,100,528 | 8/1963 | Plummer et al. | 166—42 X |

CHARLES E. O'CONNELL, *Primary Examiner.*

IAN A. CALVERT, *Assistant Examiner.*